May 21, 1935.  H. F. PARKER  2,001,937
BRAKE
Filed May 17, 1930   3 Sheets-Sheet 1

INVENTOR.
HUMPHREY F. PARKER
BY M.W. McConkey
ATTORNEY

May 21, 1935.  H. F. PARKER  2,001,937
BRAKE
Filed May 17, 1930  3 Sheets-Sheet 2

INVENTOR.
HUMPHREY F. PARKER
BY M.W.McConkey
ATTORNEY

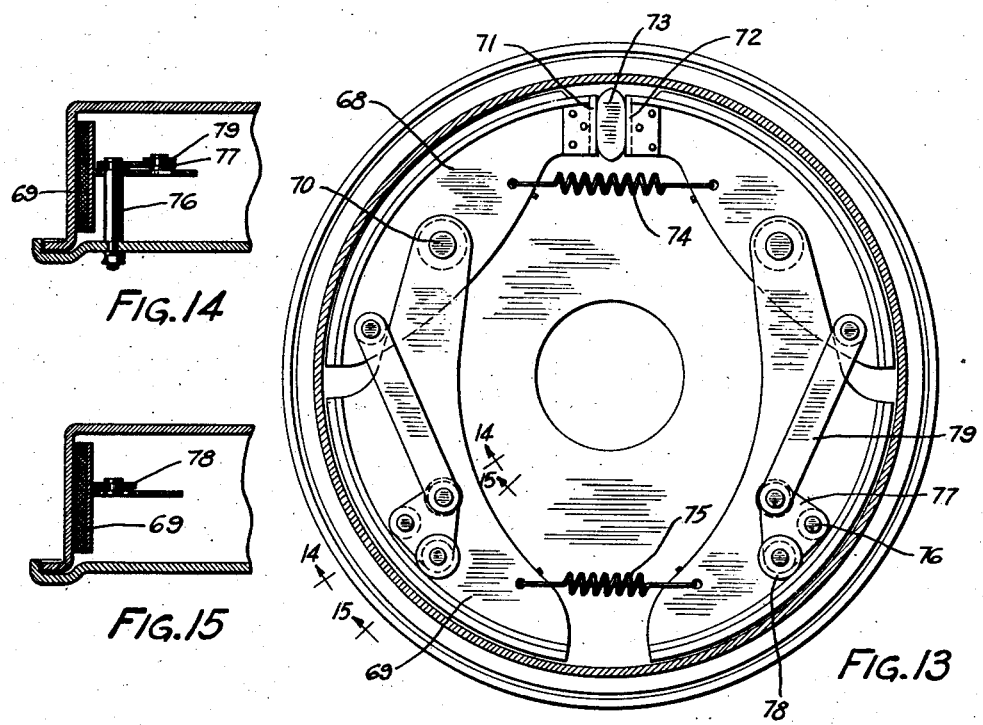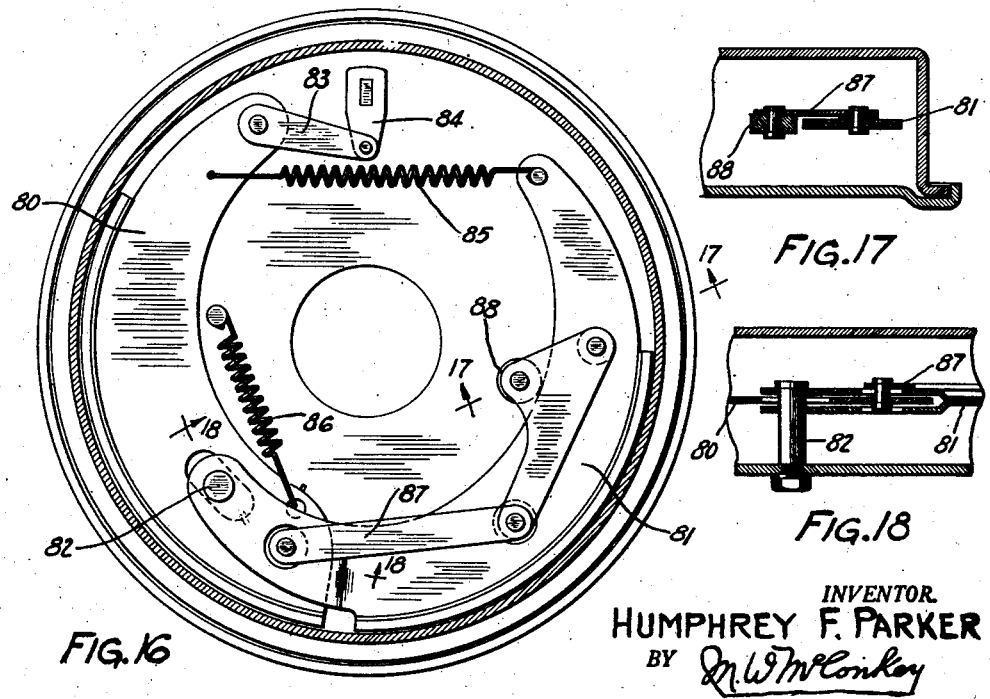

Patented May 21, 1935

2,001,937

UNITED STATES PATENT OFFICE 2,001,937

BRAKE

Humphrey F. Parker, South Bend, Ind., assignor to Bendix Brake Company, South Bend, Ind., a corporation of Illinois Application May 17, 1930, Serial No. 453,380

12 Claims. (Cl. 188—78)

This invention relates to brakes and more particularly to internal expanding brakes.

In brakes of the servo type, a thrust derived from pressure upon the brake pedal is exerted on a primary shoe, forcing it in contact with direct rotation of the drum. The heel of the primary shoe is attached to the toe of the secondary shoe, forcing it in contact with the drum, also in the direction of rotation with the drum.

This gives a greater increased braking effect but unfortunately it also causes variation in the co-efficient of friction of the brake lining. It is the aim of the present invention to improve this structure.

An object of the invention is a reduction of the undesirable effects which accompany changes in the co-efficient of friction in brakes.

Another object of the invention is to improve the structure of brakes of the servo type which have a servo action in both the forward and reverse directions.

Other objects will appear from the following description taken in connection with the drawings and forming a part of this specification:

Figure 13 is a side elevation of a brake comprising four shoes to which the invention has been applied.

Figure 14 is a section substantially on line 14—14, Figure 13.

Figure 15 is a section substantially on line 15—15, Figure 13.

Figure 16 is a side elevation of a brake comprising two shoes to which the invention has been applied.

Figure 17 is a section substantially on line 17—17, Figure 16.

Figure 18 is a section substantially on line 18—18, Figure 16.

Figure 2:
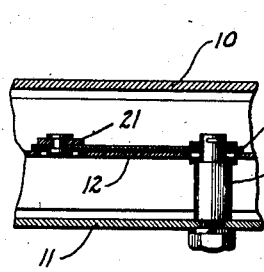
Figure 2 is a section substantially on line 2—2, Figure 1.
Figure 3:
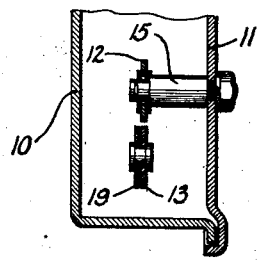
Figure 3 is a section substantially on line 3—3, Figure 1.
Figure 1:
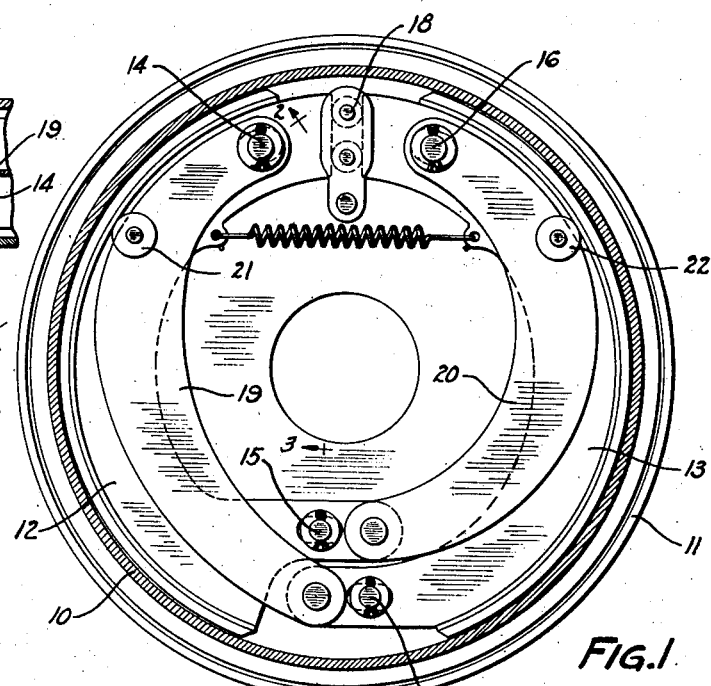
Figure 1 is a side elevation of a brake comprising two friction members.

Referring to the drawings for more specific details of the invention, 10 represents a rotatable drum at the open end of which is positioned a fixed support such as a backing plate 11. Positioned for movement on the backing plate is a primary shoe 12 and a secondary shoe 13. As shown, the primary shoe is mounted on anchors 14 and 15 and the secondary shoe is mounted on anchors 16 and 17 and positioned between the shoes is a cam 18.

The primary shoe is connected by a link 20 to the anchor 16 and the secondary shoe is connected by a link 19 to the anchor 14. The link 19 has positioned thereon, a thrust roller 21 engaging the shoe 13 and the link 20 carries a thrust roller 22 engaging the shoe 12. The thrust rollers 21 and 22 engage the respective shoes substantially midway of the center of the shoe and the toe or shoulder end. Each shoe occupies somewhat less than half the circumference of the brake drum. The cam 18 acts on the shoulders to engage the toes of the shoes with a drum, and the respective heels of the shoes are pinned to links which in turn are pinned to the anchors adjacent to the shoulders.

The links 19 and 20 bear through the thrust rollers 21 and 22 on the shoes, acting as levers with their fulcrums on the anchor pins 14 and 16. The reaction from the shoes is applied to the brake support at the anchor pins by a force greater than the reaction of the self-actuating shoe as applied through the thrust rollers.

The heal of each shoe has a slot which fits over the anchor pins 15 and 17 located opposite the cam. The heel of the self-actuating shoe 12 moves away from the anchor, but the heel of the non-self-actuating shoe 13 bears against it, so that the drag of the non-self-actuating shoe is applied to the brake support at this point. The link 19 of the non-self-actuating shoe is inactive, making a slight rotary movement about its anchor pin 14 and moving away from the self-actuating shoe 12. When the direction of rotation of the wheel is reversing, the self-actuating shoe 12 becomes a non-self-actuating shoe and vice versa.

Figure 4:
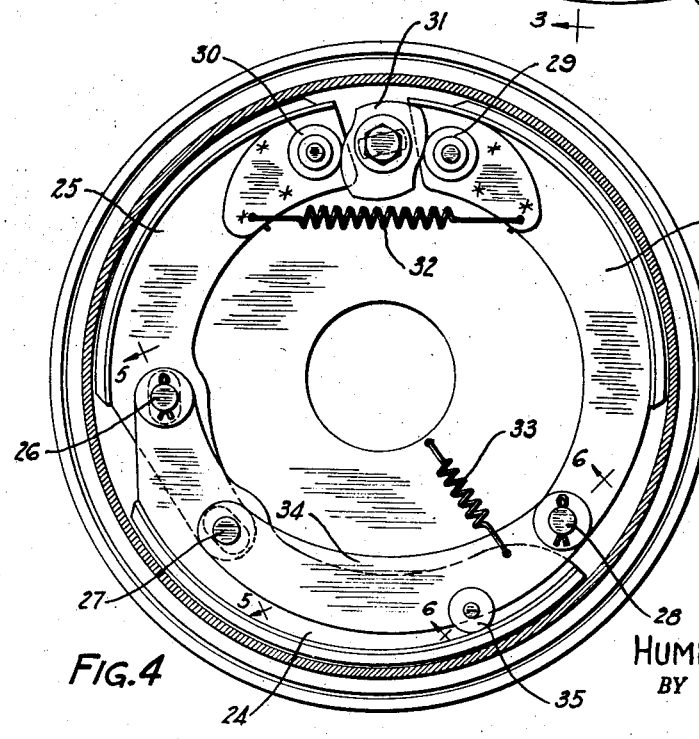
Figure 4 is a side elevation of a brake comprising three shoes to which the invention has been applied.
Figure 5:
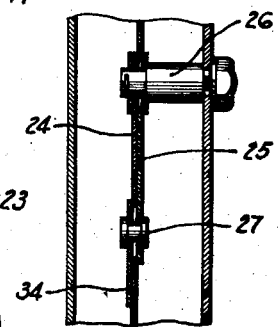
Figure 5 is a section substantially on line 5—5, Figure 4.
Figure 6:
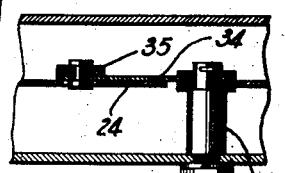
Figure 6 is a section substantially on line 6—6, Figure 4.
Figure 8:
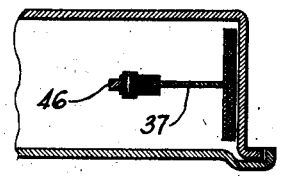
Figure 8 is a section substantially on line 8—8, Figure 7.
Figure 9:
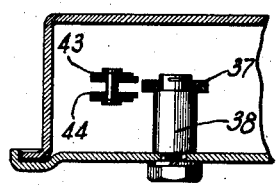
Figure 9 is a section substantially on line 9—9, Figure 7.

Figure 4 illustrates a three-shoe servo brake to which the invention is applied. In this embodiment of the invention, the fixed support has positioned thereon for movement, a primary shoe 23, a secondary shoe 24 and an auxiliary shoe 25. As shown, the secondary shoe 24 is positioned on an anchor 26 and the auxiliary shoe is positioned on an anchor 27 and an articulating pin 28 connects the primary shoe to a link, to be hereinafter described. The primary shoe 23 and the auxiliary shoe 25 are provided on their separable ends with rollers 29 and 30 between which is positioned an operating cam 31.

The primary shoe 23 and the auxiliary shoe 25 are connected by a coil spring 32 and the secondary shoe 24 is connected by a coil spring 33 to a fixed support on the backing plate. These springs serve to return the shoes to the off position and to retain them in proper spaced relation to the drum.

A link 34 is connected by one end to the articulating pin 28 and the other end of the link is pivoted on the anchor 27. This link carries a thrust roller 35 adaptable for engagement with the secondary shoe 24 in spaced relation to the toe of the shoe. As shown, the thrust roller is positioned midway between the center of the shoe and the toe. When the cam 31 is actuated, the toe of the primary shoe is applied to the drum. This tends to move the shoe in the direction of rotation and does, in fact, do so slightly. The reaction of the forces acting on the shoe is applied to the link at the articulating pin 28 and through the link 34 connected thereto and to the anchor 27 and thrust roller 35 is forced against the secondary shoe to press the toe again the drum.

Figure 7:
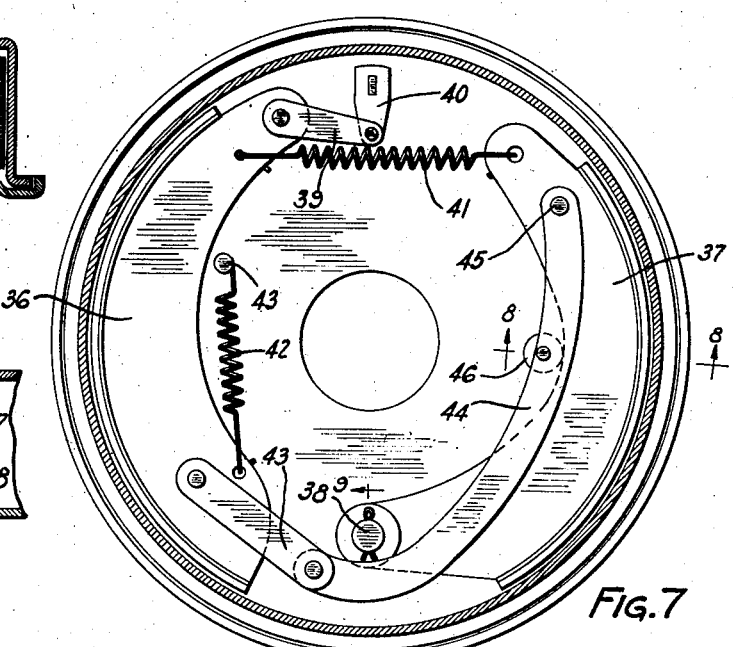
Figure 7 is a side elevation of a brake of the two-shoe type, illustrating a modification of the invention.

Figure 7 illustrates a modified form of the invention wherein the fixed support or backing plate has positioned thereon a primary shoe 36 and a secondary shoe 37. As shown, the secondary shoe is positioned on an anchor 38 and the primary shoe is connected by a link 39 to an actuating cam 40.

The primary and secondary shoes are connected by a coil spring 41 and the primary shoe is connected by a coil spring 42 to a fixed support 43. These springs serve to return the shoes to the off position and to retain them in proper spaced relation to the drum. The primary shoe is pivotally connected at its heel to a link 43 which in turn is pivotally connected to a link 44, anchored on the secondary shoe adjacent the toe thereof, as indicated at 45.

The link 44 carries a thrust roller 46 in engagement with the secondary shoe 37. As the cam 40 is actuated to engage the toe of the shoe 36 with the drum, a slight movement of the shoes with the rotating drum is attained. This imparts a thrust through the link 43 and link 44 to the anchor 45, resulting in a radial force being applied to the shoe 37 through the thrust roller 46.

Figure 10:
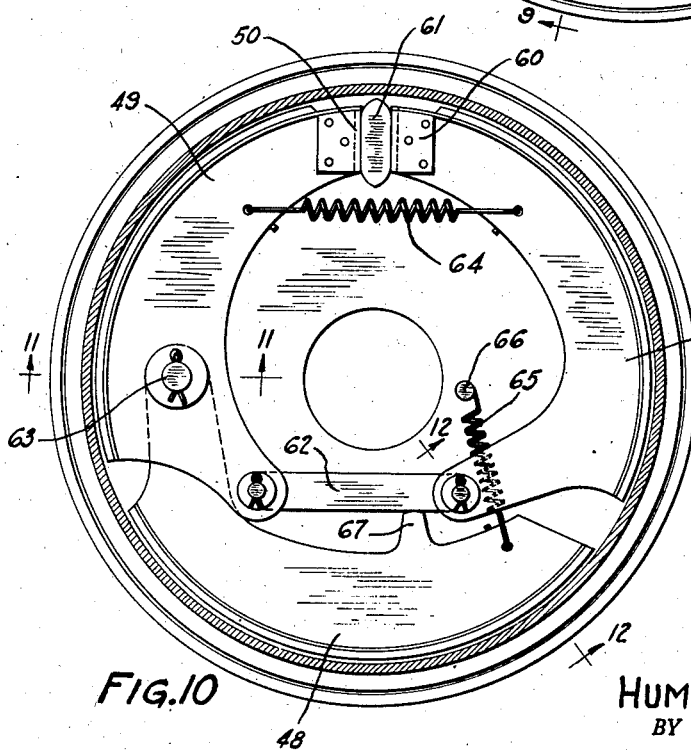
Figure 10 is a side elevation of a brake of a three-shoe type, illustrating an allocator of the invention.
Figure 11:
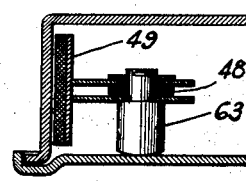
Figure 11 is a section substantially on line 11—11, Figure 10.
Figure 12:
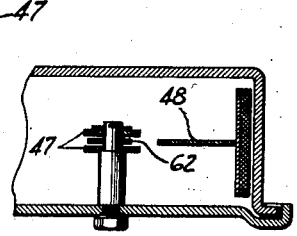
Figure 12 is a section substantially on line 12—12, Figure 10.

Figure 10 embodies another modification of the invention wherein the fixed support has positioned for movement thereon a primary shoe 47, a secondary shoe 48 and an auxiliary shoe 49. The primary shoe 47 and the auxiliary shoe 49 have shoulder portions 50 and 50 between which is positioned an operating cam 51. The primary and auxiliary shoes are connected by a link 62 and the auxiliary and secondary shoes are anchored as indicated at 63. The primary and auxiliary shoes are connected by a return spring 64 and the secondary shoe is connected by a return spring 65 to a fixed support 66. The springs serve to return and retain the shoes in the off position.

The secondary shoe is provided with a lug 67 engaging the link 62 and adapted to slide thereon.

When the cam is actuated to spread the primary and auxiliary shoes, the toe of the primary shoe is moved to engage the drum, whereupon the shoe moves slightly with the drum. This causes a movement of the link 62 to impart a radial force to the toe of the secondary shoe through lug 67 or thrust roller, as the case may be. It is, of course, to be understood that when the direction of rotation of the drum is reversed, the action of the primary and secondary shoe is also reversed.

Figure 13 illustrates a further modification of the invention, showing the invention as applied to a four-shoe brake. In this embodiment of the invention, the shoes are arranged in pairs, each pair comprising a primary shoe 68 and a secondary shoe 69, positioned on an anchor 70. The respective pairs are mounted in oppositely disposed relation with respect to each other. The primary shoes 68 have shoulders 71 and 72 between which is positioned an operating cam 73.

The primary shoes are connected by a coil spring 74 and the secondary shoes are connected by a coil spring 75. These springs serve to return and retain the shoes in off position with a suitable clearance between the shoes and the drum.

Positioned on the backing plate and oppositely disposed with respect to each other are studs 76 on which is mounted a cam 77. This cam is provided with a thrust roller 78 and is adapted to be actuated by a link 79 pivotally connected to the primary shoe 68 adjacent to the heel thereof.

In operation, when the cam is actuated to spread the shoes, the toes of the primary shoe engage the drum and the shoe slightly rotates therewith. This movement actuates a cam 77 through the link 79 to direct the thrust roller 78 against the secondary shoe at a point removed from the toe thereof.

In Figure 16, I have illustrated a further modification form of the invention. In this particular embodiment, the primary shoe 80 and the secondary shoe 81 are positioned for movement on the backing plate 11. As shown, the shoes are mounted on an anchor 82. The primary shoe is connected by a link 83 to an actuating crank 84 and return springs 85 and 86 are connected between the primary and secondary shoes and the primary shoe and a fixed support to return and retain the shoes in the off position with clearance between the shoes and the drum.

Connected between the primary shoe and the secondary shoe is a toggle 87 upon which is positioned a thrust roller 88 in engagement with the secondary shoe 81. It should be noted that this toggle is connected at one end to the primary shoe adjacent the heel thereof and to the secondary shoe approximately midway of the center and toe of the shoe. The mode of operation of this particular structure is substantially the same as that of Figure 7.

Although this invention has been described in connection with certain specific embodiments, the principles involved are susceptible to numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a plurality of friction elements positioned for movement thereon, a drum associated with the friction elements, means for actuating the friction elements for co-operation with the drum, means connecting the toe of one friction element to the heel of the other friction element and means carried by the connecting means engaging the friction elements at a distance removed from the toes thereof to force the friction elements in engagement with the drum.

2. A brake comprising a fixed support, two friction elements positioned for movement thereon, a lever connecting the toe of each friction element to the heel of the other friction element, thrust members on the levers engaging the friction elements and means for actuating the friction elements for engagement with the drum.

3. A brake comprising a fixed support, three friction elements positioned for movement thereon, a drum associated with the friction elements, anchors for at least two of the friction elements and a lever pivotally connected to the third friction element, a thrust roller carried by the lever engaging one of the friction elements at a point removed from the toe thereof and means for spreading the friction elements for uniform engagement with the drum.

4. A brake comprising a plurality of shoes, each pivoted at one end on a link extending beside the other shoe, and applying means acting on the other ends of said shoes.

5. A brake comprising a plurality of shoes, each mounted on anchoring means extending beside the other shoe for substantially its full length and anchored adjacent the opposite end of said other shoe.

6. A brake having a pair of shoes each having an anchor post adjacent one end, and means connecting the end of each shoe furthest from the adjacent post to the anchor post adjacent the end of the other shoe.

7. A brake having a pair of shoes each having an anchor post adjacent one end, and a link pivotally connecting the end of each shoe furthest from the adjacent post to the anchor post adjacent the end of the other shoe.

8. A brake having two shoes, an applying device acting on adjacent ends of the shoes, anchorage means adjacent the applying device, and means connected to the other end of each shoe and to the anchorage means and which extends past the other shoe.

9. A brake having two shoes, an applying device acting on adjacent ends of the shoes, anchorage means adjacent the applying device, and a linkage connected to the other end of each shoe and to the anchorage means and which linkage extends past the other shoe.

10. A brake comprising a shoe, an applying device engaging one end of the shoe, and a rigid link directly connected to the other end of the shoe at the side of the brake opposite the applying device and anchored adjacent the applying device.

11. A brake comprising a shoe, an applying device engaging one end of the shoe, a linkage connected to the other end of the shoe and anchored adjacent the applying device, and another shoe arranged beside the linkage.

12. A brake comprising a shoe, an applying device engaging one end of the shoe, a linkage anchoring the other end of the shoe, another shoe arranged beside the linkage and operatively engaged by the linkage, and an anchor for the linkage arranged between the ends of said other shoe.

HUMPHREY F. PARKER.